Dec. 1, 1953     A. O. GREENE     2,660,784
MEASURING SCOOP WITH EJECTION MECHANISM
Filed March 1, 1952
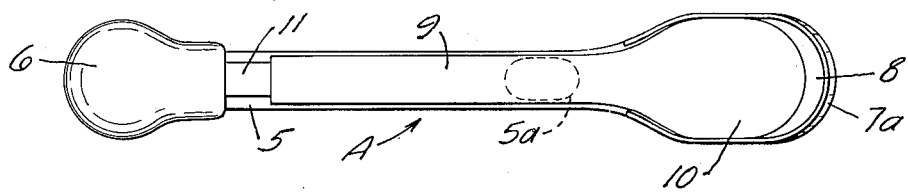
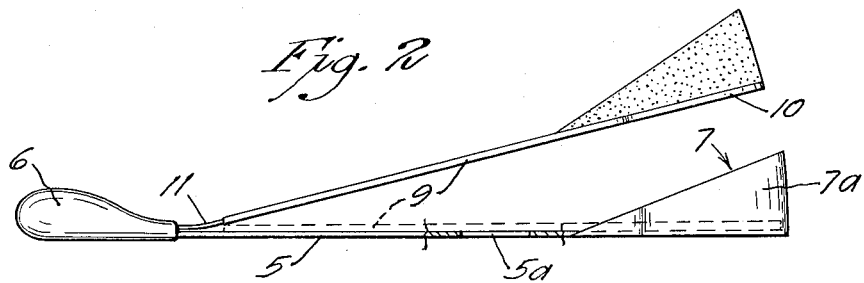
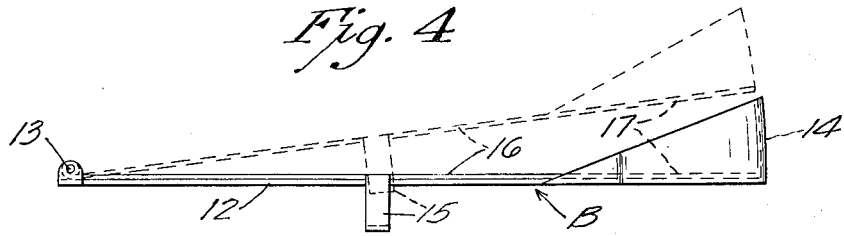
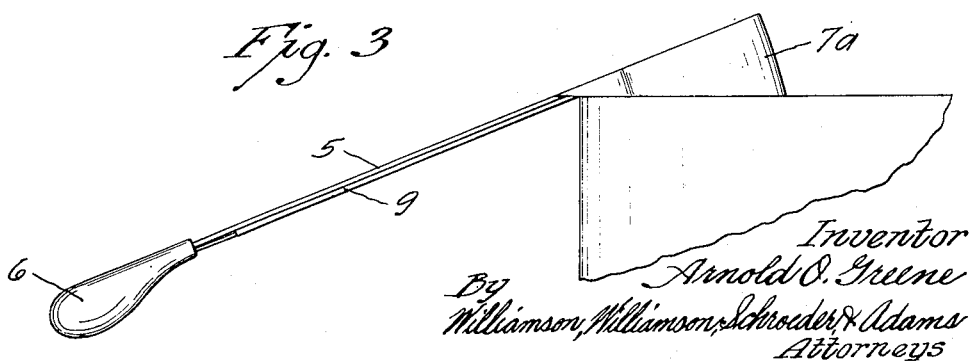
Inventor
Arnold O. Greene
By Williamson, Williamson, Schroeder & Adams
Attorneys Patented Dec. 1, 1953

2,660,784

UNITED STATES PATENT OFFICE 2,660,784

MEASURING SCOOP WITH EJECTION MECHANISM

Arnold O. Greene, Austin, Minn.

Application March 1, 1952, Serial No. 274,443

5 Claims. (Cl. 30—115)

1

This invention relates generally to measuring scoops and particularly to a measuring scoop of the self-dispensing type.

It has long been a messy and disagreeable job for cooks and bakers to measure out soft and often greasy semi-solid ingredients such as shortening and to dispense the same into the mixing bowl. It has been difficult to obtain precise measurements of such ingredients and, after measuring the ingredient, it has been a problem to dispense the same into the mixing container. In the past it has been necessary to use another spoon or to scrape the measuring utensil with a knife or even a finger.

It is an object of my invention to provide a novel and highly efficient measuring scoop constructed to permit precise measuring of a relatively soft semi-solid material such as shortening or butter and to subsequently dispense the measured semi-solid ingredient into the mixing bowl for intermixing with the other ingredients.

It is another object to provide a measuring scoop assembly including a gripping handle with a measuring element mounted at one end thereof and having upstanding side walls defining an open topped measuring chamber, said assembly also including an outwardly shiftable dispensing element forming a bottom within the measuring chamber and having a peripheral shape to closely conform to the inner peripheral shape of said chamber and having guiding means to permit outward shifting movement thereof from said chamber to discharge the measured ingredient from the chamber.

More specifically, it is an object of my invention to provide a measuring scoop assembly having a handle with a measuring element connected at one end thereof and having upstanding side walls defining an open topped measuring chamber, said chamber being provided with a removable bottom hingedly mounted for swinging movement on said handle and having a peripheral shape to closely conform to the inner peripheral shape of said chamber and including means for facilitating upward swinging movement of said bottom out of said chamber to remove the measured material therefrom.

It is still another object to provide a measuring scoop assembly of the class described in which the measuring element is constructed of upstanding side walls materially higher at the outer free end portions thereof than at the inner ends thereof and having their upped edge portions all disposed in an inclined plane relative to said handle to permit uniform removal of excess material contained within the scoop element.

2

These and other objects and advantages of my invention will more fully appear from the following description made in connection with the accompanying drawings wherein like reference characters refer to the same or similar parts throughout the several views and in which:

Fig. 1 is a top plan view of one form of my scoop assembly showing the bottom platform lever in raised position;

Fig. 2 is a side elevational view thereof showing a measured quantity of an ingredient on the scoop bottom platform in raised position above the measuring element of the scoop;

Fig. 3 is a side elevational view showing the scoop in operative position relative to an ingredient container for removal of excess material therefrom; and Fig. 4 is a side elevational view of a modified form of my scoop showing the bottom platform and lever in retracted position by full lines and in elevated position by dotted lines with a measured quantity of an ingredient shown on the raised bottom platform.

As illustrated in the accompanying drawings, I provide a measuring scoop assembly having an elongated handle lever 5 with a gripping element 6 at one end thereof and a measuring element 7 mounted at the other end thereof. The measuring element 7 has upstanding peripheral walls defining a measuring chamber therewithin and has an open top. The side walls of the element 7 are designated by the numeral 7a and the measuring chamber defined by said walls is designated by the numeral 8. The upper edge of the peripheral side wall 7a lies in a plane inclined relative to the handle lever 5, as best shown in Figs. 2, 3 and 4, and this permits and greatly facilitates accurate measurement by permitting the material therein to be leveled off as shown in Fig. 3. The inclined side walls 7a cause the material therein to be shifted outwardly toward the closed bowl end of the scoop element 7 to cause the entire chamber 8 to be filled. This is of course essential to accurate measurement of the ingredient.

A second lever 9 is hingedly connected at the rear end of handle lever 5 and extends forwardly therefrom in overlapping relation to the underlying handle lever 5 and is provided at the forward end thereof with an ejector platform 10 having an outer peripheral shape to closely conform to the inner peripheral shape of the measuring chamber 8 with the edge portions thereof closely associated with the upstanding wall portions 7a of said measurement element 7. When in closed retracted position, the ejector platform 10 forms a bottom for the open topped chamber 8 to permit said chamber to be filled with material to be measured therein. When the chamber has been completely filled with the platform in retracted position and the material therein leveled off along the plane defined by the upper edge of the side wall 7a, the platform 10 can be raised into the elevated position shown in Fig. 2 to eject the material from the measuring chamber 8. In order to facilitate shifting the platform 10 into elevated position, a spring 11 is provided to urge lever 9 upwardly and, in addition to the tension of spring 11, suitable means for positively shifting the lever 9 upwardly are provided such as the aperture 5a formed in the lower lever handle 5 to permit upwardly directed pressure to be exerted on the bottom side of upper lever 9. The measured ingredient on the ejector platform 10 may be easily scraped from the top flat surface thereof as by sliding said surface across the top edges of the mixing bowl or by any other suitable means.

The form of my invention thus far described and illustrated in Figs. 1 through 3 inclusive is designated by the letter A. A second form of my invention, B, is illustrated in Fig. 4 and consists in a lever handle 12 generally similar to the handle lever 5 and having a measuring element 14 mounted at the outer end thereof. The element 14 is similar in all respects to the measuring element 7 described for form A of my invention. A second lever 16 shown in retracted position by full lines in Fig. 4 and in elevated ejecting position by dotted lines is pivotally mounted to the lever handle 12 at the rear end thereof as by the pivot pin 13. The lever 16 has an ejector platform 17 formed at the outer free end thereof and this platform 17 is similar in all respects to the platform 10 described for form A of my invention. In form B of my invention a depending U-shaped member 15 is fixed to the medial portion of the upper lever 16 and extends downwardly around the lower lever handle 12 in slidable relation therewith and upwardly directed pressure on the bottom of U-shaped member 15 urges the upper lever 16 upwardly into ejecting position as shown by the dotted lines of Fig. 4. The cross bar at the bottom of member 15 limits the upwardly directed movement of lever 16.

The following is a description of the operation of form A of my invention. The top lever 9 and ejector platform 10 are initially depressed into retracted position so that the platform 10 forms the bottom of the measuring chamber 8. With the platform in retracted position the scoop is then dipped into an ingredient container and filled with the semi-fluid ingredient such as shortening contained therein. The excess material is scraped off along the plane defined by the upper edge of the side walls 7a by any suitable means such as by scraping the scoop across the top of the ingredient container, as shown in Fig. 3. This scraping operation not only removes the excess material but also insures complete filling of the measuring chamber 8 by moving the material toward the upstanding end portion of the measuring element 7. After the scoop has been filled, the upper lever 9 is permitted to swing upwardly and carry the measured quantity of the ingredient out of the chamber 8. If the resilient spring 11 is of insufficient tension to remove the platform 10 from the chamber 8, slight upwardly directed force may be required by pressing upwardly on an intermediate portion of the lever 9 through the aperture 5a. When the platform has been swung upwardly into raised position as shown in Figs. 1 and 2, the ingredient measured thereon may be easily scraped off to be intermixed with the other ingredients in a mixing bowl or the like.

The operation of form B of my invention is substantially similar to that described for form A. The scoop is filled in the same manner as that described for form A of my invention and the ingredient is ejected from the measuring compartment by pressing upwardly on the U-shaped member 15. The ingredient of course is scraped off from the ejector platform 17 in the same manner in which it is removed from platform 10.

It will be seen that I have provided a relatively simple yet highly efficient measuring scoop assembly which is adapted to not only measure out a precisely predetermined volume of a semi-solid ingredient such as shortening but is also equipped with an ejector platform for quickly and efficiently removing the entire measured quantity of the ingredient from the measuring chamber. Form A of my invention includes a leaf spring 11 for applying the normal ejecting force required but it is also provided with an opening through the lever handle 5 to permit additional upwardly directed pressure to be applied to the platform carrying lever 9. The form of my invention illustrated and designated by the letter B has no resilient member for urging the platform 17 into ejecting position but relies solely on the upwardly directed pressure applied to the cross element of the U-shaped member 15.

It will, of course, be understood that various changes may be made in the form, details, arrangement and proportions of the parts without departing from the scope of my invention, which, generally stated, consists in the matter shown and described herein and set forth in the appended claims.

What I claim is:

1. An ingredient measuring scoop assembly comprising a pair of elongated lever elements, one forming a handle and having an open topped measuring element with upstanding side walls of outwardly progressively increasing depth defining a generally wedge shaped measuring chamber, the other lever having an ejection element fixed thereto and shiftably mounted into and out of said measuring chamber with the outer periphery thereof closely associated with the inner side wall surface of said chamber, said two levers being hingedly interconnected to overlap one over the other and one of said levers having means cooperatively associated therewith permitting the ejection element to be forcibly projected upwardly out of said measuring chamber.

2. The structure set forth in claim 1 and the lever forming the handle having an aperture therethrough at an intermediate portion thereof to permit direct ejection force to be applied to the ejection lever.

3. The structure set forth in claim 1 and the lever carrying said ejection element having a depending pressure applying element fixed to an intermediate portion thereof and extending downwardly below the handle lever to permit upwardly directed pressure to be applied to said ejection lever.

4. The structure set forth in claim 1 and resilient means for normally urging said ejection lever upwardly into ejecting position to normally carry an ingredient measured in said measuring chamber out of said chamber.

5. A measuring scoop assembly comprising an elongated handle, a measuring element fixed at one end of said handle and having sides of progressively increasing depth from the inner end to the outer end of said element and defining an open-topped measuring chamber gradually increasing in depth toward the outer end thereof to provide a generally wedge shaped measuring chamber, and ejector platform mounted for shifting movement into and out of said chamber, controllable means connected with said ejector platform permitting the positive shifting movement thereof into and out of said chamber, the outer periphery of said platform conforming closely with the outer periphery of the chamber defined by said walls, and said platform normally forming the bottom of said chamber during the filling thereof.

ARNOLD O. GREENE.

References Cited in the file of this patent

UNITED STATES PATENTS

| Number | Name | Date |
|---|---|---|
| 554,550 | Thode | Feb. 11, 1896 |
| 659,146 | Hayden | Oct. 2, 1900 |
| 772,674 | Rommer | Oct. 18, 1904 |
| 1,561,558 | Manos | Nov. 17, 1925 |
| 1,642,726 | Gardner | Sept. 20, 1927 |